United States Patent Office 3,541,647
Patented Nov. 24, 1970

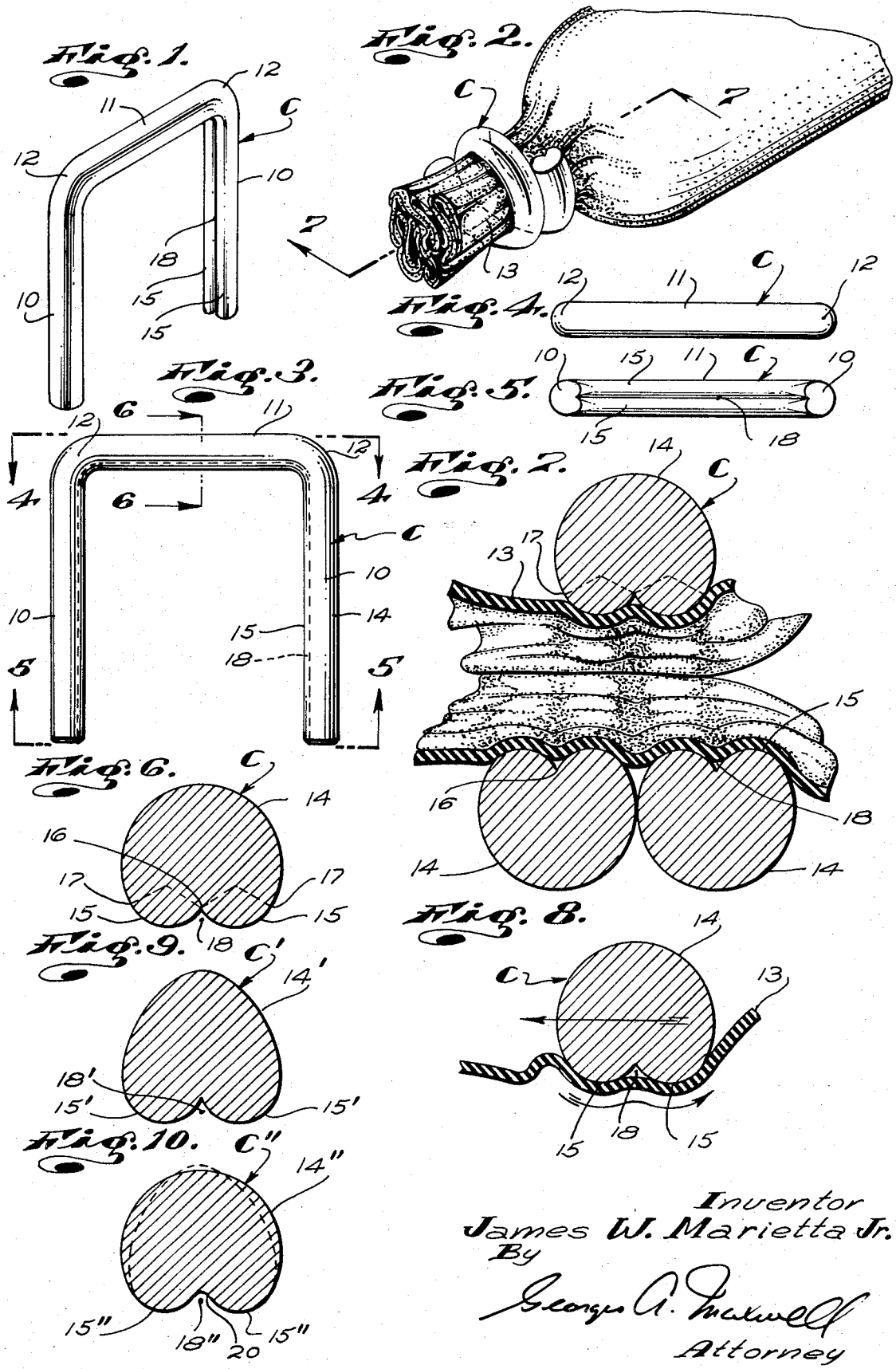

3,541,647
CASING CLIP
James W. Marietta, Jr., c/o D-Mar Company, 1116 W.
24th St., Los Angeles, Calif. 90007
Filed Dec. 31, 1968, Ser. No. 788,297
Int. Cl. B65d 55/08
U.S. Cl. 24—30.5                                        10 Claims

ABSTRACT OF THE DISCLOSURE

A normally U-shaped casing clip adapted to be deformed into encircling engagement about a gathered together opening end of a flexible casing or the like, and having crown and leg portions of uniform cross-section, said portion having a pair of adjacent permanently inwardly disposed, convex casing engaging surfaces having converging inner edges defining a central inwardly opening V-shaped groove and having outer edges converging substantially tangentially with a curved outside surface, said clip being free of corners and edges that might otherwise bite into and cut or tear a casing.

---

This invention has to do with a fastener and is more particularly concerned with an improved, substantially U-shaped, staple-like casing clip adapted to be engaged about a gathered opening end of a casing or the like, to urge and hold said casing end closed and sealed.

The clip of the present invention relates to that form and/or type of clip widely used in the meat packing and food processing arts to engage about and seal the ends of sausage casings or plastic bags in which poultry and other foodtsuffs are enveloped, to hold and maintain the opening ends of the casings and bags closed and sealed.

Casing clips of the general character referred to and provided by the prior art are U-shaped parts established of relatively soft, malleable aluminum wire or rod stock, round in cross-section and having a pair of normally straight, laterally spaced, parallel legs, and a transversely extending crown formed integrally with and extending between related ends of the legs.

When used, such clips are initially engaged over a gathered opening end of a sausage casing or bag, in straddling relationship therewith and then, by means of power operated or manually operated forming machines or tools, are urged and worked upon to form the clips about the casing or bag in encircling relationship therewith, with the ends of said legs in butted engagement or with their end portions in overlapping juxtaposition and in tight holding and sealing relationship with the casing or bag. Accordingly, such clips are not unlike a conventional staple or hog ring except for the work with which they are related and the special ways in which they are formed, to cooperate with their related work.

In the course of using clips of the character referred to, care must be taken to form the clips sufficiently tight and snug about the casings or bags so as to assure a secure and tight seal, but not so tight as might damage the casing or bag and render it useless.

In connection with the above, several very important factors come into play. First, the casings or bags are generally established of animal intestines or a suitable light, relatively soft, flexible plastic and are subject to being damaged and torn when pinched tight or otherwise subjected to shearing and/or tensile force. Second, such casings and bags, at the time they are closed and sealed, are frequently wetted and made extremely slippery and difficult to handle by the presence of fluid from the foodstuff being handled and water. Third, while such clips are intended for and used to hold and secure the opening ends of their related casings and bags closed and sealed, they must frequently be engaged with said casings and bags in such a manner as to afford limited relative slipping relative to the casings and bags to allow for expansion of the foodstuff therein without resulting rupturing of the casing or bag. Fourth, the clips are frequently used to support and handle the encased product by establishing a hook-engaging means, securing a hanger loop to the product, or the like. Last, the end, encased product is frequently quite heavy and if supported or hung in one of the manners noted above (item fourth), imparts considerable strain and force on the casing adjacent the clip, which strain and force, when slightly biased, tends to damage the casing.

In accordance with the above-noted factors and a number of other special or unique factors which will not be discussed, it will be appreciated and should be noted that casing clips must be used with care so that they hold their related casings and bags closed and sealed, yet allow for a limited amount of slippage and movement and, at the same time, so they do not crush, damage or tear the casings or bags.

Clips of the character referred to and made of round wire stock have, prior to the present invention, proved most satisfactory, as they are free of any and all corners and edges which might cut and damage the casings and bags. Such clips are free of corners that might distribute and direct excessive forces onto the casings and bags when they are hanged by means of the clip and/or when the clips are caused to move relative to the casings and bags.

Clips such as referred to above and made of round wire stock are wanting in that they establish limited direct contact with the casings and bags and with the result that the pressure or force with which they must be made to engage the casings and bags must be controlled and held within extremely close tolerances. As a result of the above, the clippings of casings and bags must be constantly supervised by a skilled person who has developed the art of determining when the proper forces are being employed.

Attempts have been made by the prior art to improve the holding effect of casing clips and to extend or widen the tolerances of force that can be employed without damaging the casings and bags, but each has met with limited success.

One such attempt has involved the establishment of a flat, inwardly disposed casing or bag engaging face on a clip to increase the direct surface contact of the clip on the casing or bag and so that desired holding force can be obtained with less applied pressure and so that, what would otherwise be excessive forces are distributed over a larger area without adverse effect. Such a clip, while gaining the noted desired ends, resulted in the establishment of tight radiused, if not sharp, edges along the opposite sides of the flat, inner face, which edges tend to bite into and catch the casing or bag preventing necessary limited slippage between the casing or bag and resulting in mutilation and tearing of the casing or bag.

When such a clip is employed to hang or suspend the encased end product, the clip may be slightly out of alignment with and biased relative to the casing or bag, the forces exerted between the clip and bag are resolved in such a manner that they are concentrated at points along the noted edges and in such a manner as to damage and mutilate the casings and bags. Accordingly, the above-noted attempt to improve casing clips is wanting.

In yet another attempt to improve casing clips, the prior art has provided a clip with a flat inner face, such as referred to above (with the same above-noted shortcomings) and has provided the flat inner face with a central, longitudinal groove into which a portion of the casing or bag will flow. The purpose of the groove is to form the casing or bag in such a manner as to create a tortuous path within the opening ends of the casing or bag through which fluids might otherwise leak or escape and to thereby improve the sealing effect.

While the above end result is effected, the noted groove is a concaved groove and cooperates with the related flat inner surface of the clip to define two tight radiused or sharp longitudinal edges between or inside the previously noted edges defined by the flat surface. The noted pair of inside edges tend to bite into, grip and lock with the casing or bag and to prevent any relative longitudinal movement between the clip and the casing or bag without mutilation of the casing or bag.

Further, the above-noted groove in the inner face of the clip simply establishes a relief into which the adjacent portion of a casing or bag can be displaced and does not act directly on the casing or bag for any purpose, except along the noted edges thereof.

An object of my invention is to provide an improved casing engaging clip of the character referred to having two laterally spaced, inwardly disposed, substantially radially curved surfaces whereby the cilp has substantially twice the area of direct bearing contact with a related casing or bag as a conventional clip which is round in cross-section and which is such that it retains the advantages and desirable characteristics and features of a conventional, round in cross-section, clip.

Another object of the invention is to provide a clip of the character referred to wherein the outer edges of the substantially radially curved inner surface are substantially tangent with a substantially radially curved outer surface whereby the clip is free of longitudinally extending tightly radiused or sharp edges which are subject to biting into, gripping or adversely concentrating forces onto a related casing or bag.

Yet another object of my invention is to provide a clip of the character referred to wherein the adjacent, parallel, radiused inner surfaces converge towards and join each other to define a central longitudinal inwardly disposed groove having laterally inwardly and radially outwardly convergent curved or radiused surfaces adapted to apply progressively increased, laterally and radially inwardly convergent forces on a portion of a casing or bag engaged and urged into the groove whereby an improved seal in the casing or bag is achieved.

Still further, it is an object of the present invention to provide a clip of the character referred to wherein the above-noted laterally and radially inwardly directed forces applied to a related casing or bag by the groove are directed onto the casing or bag at an angle obtuse to the longitudinal axis of the portion of the casing or bag extending through the clip and are resolved in close proximity to or at the side of the central longitudinal axis of said portion of the casing or bag remote from the side of said axis from which they are directed whereby said groove is such that it will readily permit or allow for desired, limited, relative longitudinal shifting of the casing or bag and clip without damage to the casing or bag.

It is an object of my invention to provide a clip of the character referred to wherein its outside surface (the side portions of which join substantially tangentially with the outer side portions of the inside radiused surfaces) can be round or ovoid in cross-section as desired or as circumstances require.

An object of this invention is to provide a clip of the general character referred to which is such that the latitude or tolerances of force that can be applied to a related casing or bag to gain desired gripping and sealing effect and allow or permit limited and controlled relative slippage between the clip and the casing or bag, without damage to the casing or bag, is materially greater than the latitudes or tolerances of forces for similar results afforded by clips provided by the prior art, whereby the instant clip is materially easier, more convenient and more dependable in use.

Finally, it is an object of the invention to provide a clip of the character referred to which is easy and economical to manufacture within the standards and tolerances demanded by the art.

The foregoing and other objects and features of my invention will be fully understood and apparent from the following detailed description of typical preferred forms and applications of my invention, throughout which description reference is made to the accompanying drawings:

FIG. 1 is an isometric view of my new clip;

FIG. 2 is an isometric view of a portion of a sausage with my new clip related thereto;

FIG. 3 is an elevational view of my new clip;

FIG. 4 is a top plan view taken as indicated by line 4—4 on FIG. 3;

FIG. 5 is a bottom view taken as indicated by line 5—5 on FIG. 3;

FIG. 6 is an enlarged detailed sectional view taken as indicated by line 6—6 on FIG. 3;

FIG. 7 is an enlarged detailed sectional view taken as indicated by line 7—7 on FIG. 2;

FIG. 8 is a detailed view similar to a portion of FIG. 7;

FIG. 9 is a view similar to FIG. 6 showing a modified form of my invention; and, FIG. 10 is a view similar to FIGS. 6 and 9 showing yet another form of the invention.

The casing clip C that I provide is a simple, substantially U-shaped part formed of a rather soft, malleable metal, such as aluminum, and, referring to the drawings, is characterized by a pair of normally laterally spaced, vertically extending, parallel legs 10 and a normally, substantially straight, horizontal, laterally extending crown 11 formed integrally with and extending between the upper ends of the legs 10. The crown and legs cooperate to define upper radiused corners 12 where they join.

When in use and as illustrated in FIGS. 2, 7 and 8 of the drawings, the clip C is engaged and formed about the gathered together opening end of a sausage casing 13 in encircling relationship therewith. When thus engaged with the case 13 the legs and crown of the clip are bent and formed, from their normal straight condition to a curved, substantially circular or radiused condition about the casing and so that the free end portions of the legs 10 are axially offset with respect to the central longitudinal axis of the portion of the casing about which the clip is engaged and occur in overlapped juxtaposition with each other.

The clip C is substantially uniform in cross-section throughout the longitudinal extent of the legs 10 and crown 11 thereof and is characterized by an outer surface 14 and a pair of adjacent inner surfaces 15.

The outer surface 14 is, in the preferred carrying out of the invention, substantially circular, extending at least 180° or half way about the exterior of the cross-section of the clip and defining the outside or exterior and the sides of the clip with respect to the cross-section thereof, or the outside and ends of the clip with respect to the central axis of the overall clip and the casing 13.

The inner surfaces 15 are like, parallel, adjacent convex surfaces with inner convergent edge portions 16 and outer edge portions 17 that join substantially tangentially with the side portions of the outer surface 14.

The inner surfaces 15 are laterally spaced with respect to the cross-section of the clip. The surfaces 15 are axially spaced with respect to the central axis of the entire clip and are substantially radially inwardly disposed with respect to the axis of the clip and casing when the clip is applied to the casing.

It will be apparent that the side portions of the outer surface and the adjacent outside portions of the inner surface 15 cooperate to define smoothly rounded sides, void or free of corners or edges that might bite into or catch a casing upon axial shifting of the clip relative to the casing. The noted rounded outer sides of the clip are such that the angle of the said sides becomes more acute and finally become tangent with the longitudinal axis of the portion of the casing engaged by clip as they converge therewith and with the result that upon axial movement or slipping of the casing through the clip, the rounded outer sides thereof tend to guide and feed the casing therethrough without damage thereto.

The inner edge portions 16 of the adjacent surfaces 15 cooperate to define an inwardly opening channel 18, which channel is centrally arranged and is disposed or opens radially inwardly with respect to the central axis of the clip. The channel 18 is co-extensive with the longitudinal extent of the legs and crown of the clip.

The channel 18 is unique in that the portions of the inner faces 15 that define its opposite sides are curved or radiused and are arranged in such a manner that, with respect to the central axes of the clip and casing, they are tangential to lines parallel with said central axes at the outer extremities of the channel and turn radially outwardly as they converge and so that their angle with respect to said axes of the clip and casing becomes progressively more obtuse. Accordingly, the holding or gripping force to be gained as a result of engagement of the sides of the channel with the casing increases progressively towards the center of the channel. Accordingly, the more casing that is urged into the channel, when the clip is applied, the greater the holding force.

It could be said that the channel defines progressively more acutely disposed opposing wedging surfaces which afford progressively tighter wedging engagment with the casing, the deeper the casing is urged into the channel.

While the above is true, it is to be noted that the opposite sides of the channel are radiused and curved in such a manner that no edge or corner is defined which would tend to bite into or catch the casing upon relative axial shifting of the clip relative to the casing, but rather, said surfaces or sides of the channel are disposed and shaped so as to aid and assist axial shifting and movement of the casing by, into and out of the channel.

It should be noted at this time that the casing is possessed with considerably inherent resiliency where gathered and engaged by the clip, which inherent resiliency might permit the casing to stretch and to extend substantially tangentially between the innermost portions of the inner surfaces 15 when the casing is drawn axially through the clip, but which causes the casing to flow or move out and back into the channel as tensile forces on the casing are released and to re-establish that desired upset condition in the casing which enhances its sealing characteristics.

In practice, the convex surfaces 15 can be curved about true radii or can be curved elliptically or parabolically as desired or as circumstances require. It is of ultimate or primary importance that surfaces 15 be curved so as to gain the above-noted progressive holding effect and so that no corners or edges which might bite into or catch the casing are defined.

In practice, casing clips are established in a great number of different sizes and are or can be designed for use on or in connection with special types, classes or forms of casings and bags. Accordingly, clips, in accordance with the present invention and designed to provide special and predetermined holding effect, can be advantageously established by altering the size and Shore hardness of the stock from which they are made and by changing and altering the cross-sectional configuration of the clip as circumstances require, but with out departing from the basic concepts and spirit of the invention set forth above.

In FIG. 9 of the drawings, I have shown a modified cross-section for a clip C' embodying the present invention wherein the outer surface 14' is ovoid and the channel 18', established by the inner surfaces 15', is deeper than the channel 18 in the first form of the invention. The resulting clip C' is substantially heart-shaped in cross-section and is such that the mean axis of the clip and about which it bends, and the resulting strength of the clip is varied materially from that of a slip similar to the clip shown in FIG. 6 of the drawings. Further, the deeper channel 18' will permit deeper penetration of a casing therein to increase the holding effect to be gained thereby.

In FIG. 10 of the drawings, I have shown the cross-section of a clip C". The channel defines portions of the inner surfaces 15" which are connected together by a radiused bottom 20. The outer surface 14" can be circular or, as indicated in dotted lines, can be ovoid.

The radius bottom 20 in the channel 18" of the clip C" might be necessary or desirable in certain special clips to prevent splitting of the clips when they are engaged about a casing or bag. In still other cases, the rounded bottom 20 can be provided to limit the depth of the channel 18" and so that the ability of the casing to flow and expand outwardly into the channel, as a result of its inherent resiliency, is limited and restricted and the amount of pressure which is maintained on the portion of the casing occurring in the channel is controlled.

It is to be noted that in FIGS. 9 and 10, the clips are void of any corners or edges which would likely damage a casing and that all of their surfaces are such as to permit relative movement of a casing and the clip without damage to the casing.

Having described only typical preferred forms and applications of my invention, I do not wish to be limited or restricted to the specific details herein set forth, but with to reserve to myself any modifications and/or variations which may appear to those skilled in the art.

Having described my invention, I claim:

1. A fastener to engage around and to tightly seal a gathered together opening end portion of a flexible container comprising, a normally U-shaped clip having a pair of elongated, laterally spaced, substantially parallel legs and an elongate crown formed integrally with and extending between related ends of the legs, said legs and crown being adapted to be deformed into encircling pressure engagement about a gathered together opening end portion of a flexible container; said clip formed of wire of generally uniform cross-section and shaped to provide said legs and crown with two longitudinally extending, adjacent, parallel, container engaging, convex inner surfaces directed inwardly of said clip and a curved outer surface directed outwardly of said clip.

2. A fastener as set forth in claim 1 wherein said convex inner surfaces have outwardly curved convergent inner edge portions and outwardly curved outer edge portions, said outer surface having inwardly curved side portions joining related outer edge portions of the convex inner surfaces substantially tangentially.

3. A fastener according to claim 2 wherein said outer surface is substantially circular.

4. A fastener according to claim 2 wherein said convex inner surfaces are substantially circular.

5. A fastener according to claim 2 wherein said outer surface and inner surfaces are substantially circular.

6. A fastener according to claim 2 wherein said outer surface is ovoid.

7. A fastener according to claim 2 wherein said inner surfaces are ovoid.

8. A fastener according to claim 2 wherein said outer and inner surfaces are ovoid.

9. A fastener according to claim 2 wherein said inner surfaces are substantially circular and said outer surface is ovoid.

10. A fastener according to claim 2 wherein said outer surface is substantially circular.

References Cited

UNITED STATES PATENTS

| 701,537 | 6/1902 | Buskey. | |
|---|---|---|---|
| 3,266,138 | 8/1966 | Tipper | 85—49 XR |
| 3,343,253 | 9/1967 | Omori. | |

DONALD A. GRIFFIN, Primary Examiner

REEXAMINATION CERTIFICATE (278th)
United States Patent
Marietta, Jr.

[11] B1 3,541,647
[45] Certificate Issued  Dec. 4, 1984

[54] CASING CLIP

[76] Inventor: James W. Marietta, Jr., c/o D-Mar Company, 1116 W. 24th St., Los Angeles, Calif. 90007

Reexamination Request:
No. 90/000,177, Mar. 22, 1982

Reexamination Certificate for:
Patent No.: 3,541,647
Issued: Nov. 24, 1970
Appl. No.: 788,297
Filed: Dec. 31, 1968

[51] Int. Cl.³ .................................................. B65D 55/08
[52] U.S. Cl. ............................................... 24/30.5 W

[56] References Cited
U.S. PATENT DOCUMENTS

| | | | |
|---|---|---|---|
| 3,120,230 | 2/1964 | Skold | 128/325 |
| 3,266,138 | 8/1966 | Tipper | 29/509 |
| 3,343,253 | 9/1967 | Omori | 29/505 |
| 3,363,628 | 1/1968 | Wood | 128/325 |
| 3,473,430 | 10/1969 | Niedecker | 85/49 |

*Primary Examiner*—Robert W. Hafer

[57] ABSTRACT

A normally U-shaped casing clip adapted to be deformed into encircling engagement about a gathered together opening end of a flexible casing or the like, and having crown and leg portions of uniform cross-section, said portion having a pair of adjacent permanently inwardly disposed, convex casing engaging surfaces having converging inner edges defining a central inwardly opening V-shaped groove and having outer edges converging substantially tangentially with a curved outside surface, said clip being free of corners and edges that might otherwise bite into and cut or tear a casing.

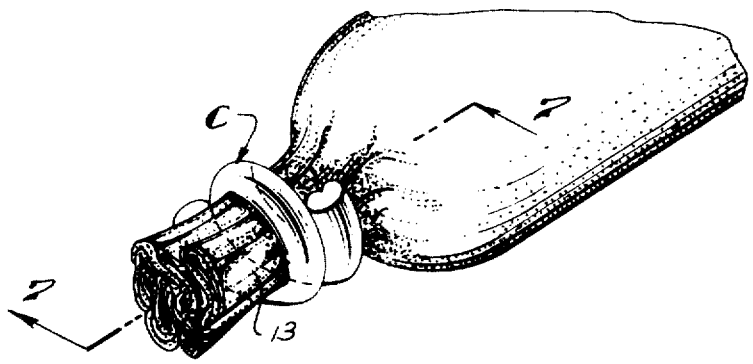

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *